United States Patent
Zhao et al.

(10) Patent No.: US 11,940,887 B2
(45) Date of Patent: Mar. 26, 2024

(54) CACHE PROGRAM WITH BACKUP BLOCKS

(71) Applicant: Innogrit Technologies Co., Ltd., Shanghai (CN)

(72) Inventors: Gang Zhao, Chandler, AZ (US); Lin Chen, Cupertino, CA (US); Jie Chen, Milpitas, CA (US); Qun Zhao, Pleasanton, CA (US)

(73) Assignee: Innogrit Technologies Co., Ltd., Shanghai (CN)

( * ) Notice: Subject to any disclaimer, the term of this patent is extended or adjusted under 35 U.S.C. 154(b) by 164 days.

(21) Appl. No.: 17/112,123

(22) Filed: Dec. 4, 2020

(65) Prior Publication Data
US 2022/0179762 A1    Jun. 9, 2022

(51) Int. Cl.
  G06F 11/00  (2006.01)
  G06F 3/06   (2006.01)
  G06F 11/20  (2006.01)

(52) U.S. Cl.
  CPC ........ G06F 11/2087 (2013.01); G06F 3/0619 (2013.01); G06F 3/064 (2013.01); G06F 3/065 (2013.01); G06F 3/0659 (2013.01); G06F 3/0679 (2013.01); G06F 2201/85 (2013.01)

(58) Field of Classification Search
CPC ... G06F 11/2087; G06F 11/2056; G06F 3/065
See application file for complete search history.

(56) References Cited

U.S. PATENT DOCUMENTS

| | | | | |
|---|---|---|---|---|
| 10,153,046 | B1* | 12/2018 | Agarwal | G11C 16/10 |
| 2013/0013874 | A1* | 1/2013 | Graefe | G06F 11/1469 |
| | | | | 711/E12.103 |
| 2016/0078966 | A1* | 3/2016 | Li | G11C 16/349 |
| | | | | 714/723 |
| 2020/0409805 | A1* | 12/2020 | Kim | G11C 16/3418 |
| 2021/0278994 | A1* | 9/2021 | Yang | G06F 3/0616 |
| 2022/0179762 | A1* | 6/2022 | Zhao | G06F 3/0659 |

* cited by examiner

*Primary Examiner* — Philip Guyton
(74) *Attorney, Agent, or Firm* — IPro, PLLC

(57) ABSTRACT

Systems, apparatus and methods are provided for performing cache program operations in a non-volatile storage system. A method may comprise issuing a first cache program operation from a storage controller to a non-volatile storage device to write data to a first regular block, writing the data to the first regular block and a copy of the data to a backup block, determining that a program error has occurred while writing the data to the first regular block, asserting the program error to the storage controller, retrieving a mapping between the first regular block and the backup block, issuing a read operation to read the copy of the data from the backup block, reading the copy of the data from the backup block and issuing a second cache program operation to write the data to a second regular block and marking the first regular block as defective.

16 Claims, 2 Drawing Sheets

CACHE PROGRAM WITH BACKUP BLOCKS

TECHNICAL FIELD

The disclosure herein relates to the NAND flash device management and implementation, particularly relates to program operations for NAND flash device.

BACKGROUND

The evolution of the modern computing system is driven in-part by the emergence of the Solid State Drives (SSDs) that have demonstrated higher performance of speed and latency over the traditional hard drives. Unlike hard drives that depend on the magnetism to store data, solid state drives use NAND flash devices to achieve data storage. The NAND flash devices are a family of integrated circuits that are manufactured by advanced process and assembly technologies to achieve multiple levels of vertical stacking of storages units into a small footprint of die and package for high capacity of storage.

The increased storage capacity with new NAND flash process technology breakthroughs have also led to reduced reliability of the NAND storage cells. For NAND flash devices, a program operation refers to the operation that writes data into the NAND flash devices. And NAND flash devices normally contain bad blocks, which include factory bad blocks that are originally defective from the manufacture process and grown bad blocks that become defective after a number of program and erase (P/E) cycles. As a well-known behavior, the NAND storage cells begin to wear out with the increased number of P/E cycles, leading to an increased number of error counts and an increased number of grown bad blocks.

NAND flash devices typically provide two kinds of program operations: regular program operations and cache program operations. Both program operations involve receiving data into cache registers (cache buffer), and moving the data into the data registers (data buffer) and the NAND storage cell arrays. The cache program operation will acknowledge the SSD controller upon the completion of data transfer from the cache buffer into the data buffer. In contrast, the regular program operation will not acknowledge the SSD controller until completion of data transfer into the NAND storage cell array, which takes a long time of program time (e.g., tPROG) in the order of several milliseconds.

Most modern SSD controllers take advantage of the cache program operations to maximize the performance of writing to NAND flash devices. With this feature enabled, the SSD controller acknowledges the host of the Write command completion once hearing from the NAND device that the data has been moved from the cache buffer into the data buffer. This approach, however, has a potential risk of program error, in which the final operation to write data into the NAND storage cells may still encounter failure when the particular NAND block becomes defective without the knowledge of the SSD controller. This is particularly a challenge for NAND flash devices with an increasing number of grown bad blocks over time.

To address the aforementioned problem of potential write failure into NAND storage array with a premature acknowledgement to the host, SSD controllers with an on-board DRAM can be configured to keep a copy of data in the DRAM until it is later confirmed to be successfully written to the NAND storage array. If the NAND reports a program error, the SSD controller can then simply conduct another program operation to the NAND device with the data from the DRAM.

For a DRAM-less SSD controller, however, this poses a bigger challenge as the controller can only keep a small limited amount of data in its internal SRAM. The incoming Write commands from the host may quickly outpace the storage capability of the internal SRAM while the controller is still waiting for the slow confirmation from NAND storage device for the limited amount of data stored in the SRAM, leading to an overflow of the SRAM. As a result, the DRAM-less SSD controller may not be able to save all the temporary data to its internal SRAM during a cache program operation, which may lead a catastrophic failure that the data failed to save to NAND storage is also failed to recover from the SRAM. Existing solutions trying to improve this situation may have to limit the number of cache program operations with DRAM-less SSD controller, which results in a reduction of performance. Alternatively, existing solutions may also increase the amount of internal SRAM at the price of bigger die size and higher silicon cost.

SUMMARY

The present disclosure provides a non-volatile storage device cache program operation that uses backup blocks to eliminate the risk of data loss due to program error. A backup block mapping table may be used to store links between regular blocks and backup blocks. During a cache program operation, a page of data is copied into both a target regular block and its mapped backup block. In the event of a program error at the target regular block, the data is recovered from the backup copy at the backup block. In some embodiments, the backup blocks may use some of the extra physical blocks provided by overprovision.

In an exemplary embodiment, there is provided a method that may comprise: issuing a first cache program operation from a storage controller to a non-volatile storage device to write data to a first regular block, writing the data to the first regular block at the non-volatile storage device according to the cache program operation, writing a copy of the data to a backup block at the non-volatile storage device, determining that a program error has occurred while writing the data to the first regular block, asserting the program error to the storage controller, retrieving a mapping between the first regular block and the backup block from a mapping table by the storage controller, issuing a read operation from the storage controller to the non-volatile storage device to read the copy of the data from the backup block, reading the copy of the data from the backup block and sending the copy of the data to the storage controller, and issuing a second cache program operation from the storage controller to the non-volatile storage device to write the data to a second regular block and marking the first regular block as defective.

In another exemplary embodiment, there is provided a non-volatile storage system. The non-volatile storage system may comprise a non-volatile storage device and a storage controller coupled to the non-volatile storage device. The storage controller may be configured to: issue a first cache program operation to the non-volatile storage device to write data to a first regular block, receive a program error from the non-volatile storage device, retrieve a mapping between the first regular block and a backup block from a mapping table, issue a read operation to the non-volatile storage device to read a copy of the data from the backup block, and issue a second cache program operation to the non-volatile storage device to write the data to a second regular block and mark the first regular block as defective. The non-volatile storage device may be configured to: write the data to the first regular block according to the cache program operation, write the copy of the data in the backup block, determine that a program error has occurred while writing the data to the first regular block, assert the program error to the storage controller, read the copy of the data from the backup block according to the read operation and send the copy of the data to the storage controller.

In yet another exemplary embodiment, there is provided a non-transitory machine-readable medium. The non-transitory machine-readable medium may have computer instructions that when executed by a hardware processor of a storage controller, cause the hardware processor to: issue a first cache program operation a non-volatile storage device to write data to a first regular block, receive a program error from the non-volatile storage device, retrieve a mapping between the first regular block and a backup block from a mapping table, issue a read operation to the non-volatile storage device to read a copy of the data from the backup block and issue a second cache program operation to the non-volatile storage device to write the data to a second regular block and mark the first regular block as defective.

DETAILED DESCRIPTION

Figure 1:
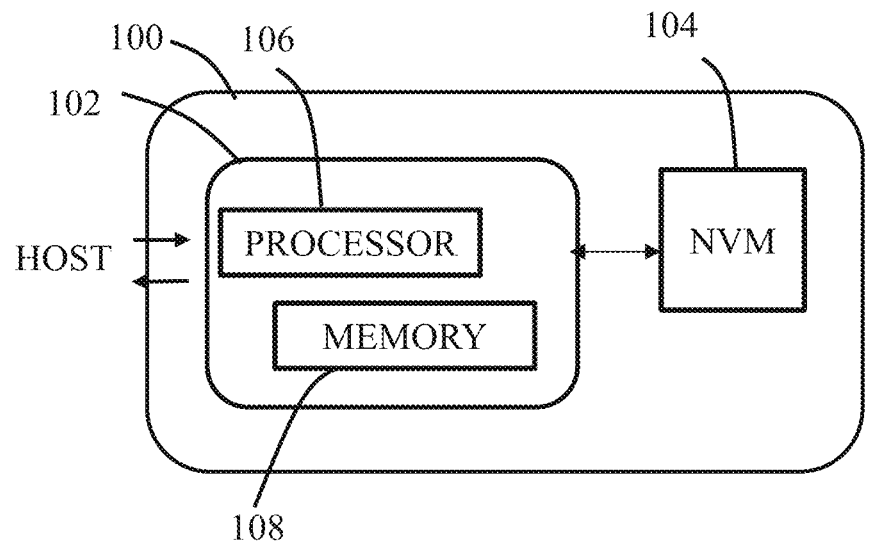
FIG. 1 schematically shows a non-volatile storage system in accordance with an embodiment of the present disclosure.

Specific embodiments according to the present disclosure will now be described in detail with reference to the accompanying figures. Like elements in the various figures are denoted by like reference numerals for consistency.

The present disclosure provides systems and methods for a cache program using a backup block to store a copy of the data that is being written to a regular block of a non-volatile storage device. As used herein, a non-volatile storage device may be a computer storage device that can maintain stored information after being powered off, and the stored information may be retrieved after being power cycled (turned off and back on). Non-volatile storage devices may include NAND flash memories, NOR flash memories, magnetoresistive random Access Memory (MRAM), resistive random access memory (RRAM), phase change random access memory (PCRAM), Nano-RAM, etc. In the description, a NAND flash may be used as an example of a non-volatile storage device for demonstrating how the cache program operation may be implemented. However, various embodiments according to the present disclosure may implement the techniques with other types of non-volatile storage devices.

FIG. 1 schematically shows a non-volatile storage system 100 in accordance with an embodiment of the present disclosure. The non-volatile storage system 100 may comprise a storage controller 102 and a non-volatile storage device 104. The non-volatile storage system 100 may provide data storage and/or access to stored data for a host when it is coupled to the host. The non-volatile storage device 104 may be a non-volatile memory (NVM) based storage device, for example, a NAND device. It should be noted that the non-volatile storage system 100 may comprise a plurality of non-volatile storage devices and the non-volatile storage device 104 may be shown as a representative for the plurality of non-volatile storage devices. The storage controller 102 may comprise a processor 106 and a memory 108. The processor 106 may be a computer processor, such as, but not limited to, a microprocessor or a microcontroller. The memory 108 may be a non-transitory computer-readable storage media, such as, DRAM or SRAM, to store computer executable instructions to be executed by the processor 106.

In various embodiments, the non-volatile storage device 104 may contain more physical blocks than advertised volumes. This may be referred to as overprovision or over-provision. The extra physical blocks may be used for bad block management, garbage collection and refresh. In some embodiments, the physical blocks in the non-volatile storage device 104 may be categorized as regular blocks and backup blocks. The regular blocks may be normal physical blocks used for storing data, for example, the physical blocks in the advertised volumes. The backup blocks may be used to temporarily store backup data for cache program operations. For example, a number of the spare blocks provided by overprovision may be redundant blocks, and may be used as backup blocks. In one embodiment, when data is being written to a regular block for a cache program operation, a copy of the data may be written to a backup block. In case there is an error while the data is being written to the regular block, the copy of the data may be retrieved and written to another regular block. Therefore, the cache program operation according to an embodiment of the present disclosure may recover from a program error without losing data.

The non-volatile storage device 104 may comprise one or more dies and each die may comprise one or more planes with each plane having a plurality of physical blocks. In some embodiments, the number of backup blocks needed may be much smaller to the number of regular blocks that the backup blocks provide backup for. Regular blocks of one plane may have one set of backup blocks to provide the data backup. The backup blocks may be maintained in a list and assigned to regular blocks in a round robin manner for regular blocks of a plane. For example, assuming there may be M backup blocks (e.g., block 0, 1, . . . , M−1), the regular blocks of a plane may be assigned to backup blocks from block 0 through block M−1 and then repeat from block 0 again in a circular manner until all regular blocks may be assigned a backup block. Accordingly, the regular blocks may be mapped to backup blocks in a many to one relationship, with many regular blocks mapped to one backup block.

The storage controller 102 may implement a number of techniques to manage the backup blocks. For example, in one embodiment, the regular blocks of the non-volatile storage device 104 may be multi-bit cells (e.g., Multi-Level Cell (MLC) or Tri-Level Cell (TLC)) while the backup blocks may be single-bit cells (e.g., Single-Level Cell (SLC)). Because of the many to one mapping relationship, the backup blocks may experience more program/erase (P/E) operations than the regular blocks and SLC cells may provide a maximize reliability and endurance to P/E operations. Moreover, the storage controller 102 may monitor the wearing of the backup blocks by keeping track of the P/E cycles and the error count. In some embodiments, for example, a threshold value for error count may be set such that further increased errors are no longer correctable. When the error count of a backup block has increased to reach the threshold value, the backup block may be treated as having reached its lifetime and the storage controller 102 may be configured to retire the backup block (e.g., removing it from the list and mapping table of backup blocks) and select another block (e.g., an SLC block) to replace the retired backup block.

Figure 2:
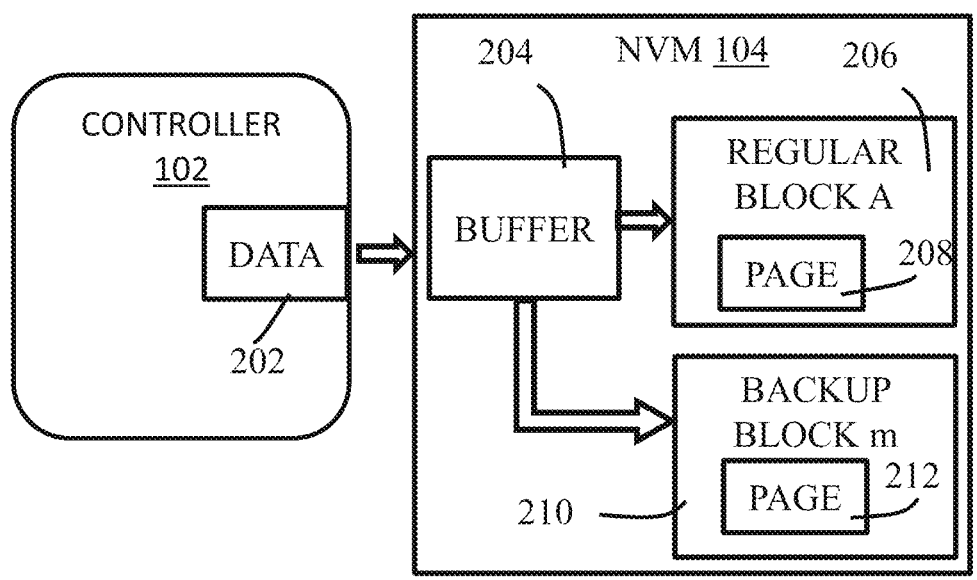
FIG. 2 schematically shows data movement in a cache program operation in accordance with an embodiment of the present disclosure.

FIG. 2 schematically shows data movement in a cache program operation in accordance with an embodiment of the present disclosure. The storage controller 102 may write a page of data 202 to the non-volatile storage device 104 in a cache program operation. The cache program operation may have a field including a physical address that may identify a target location to save the data. The target location may be a page 208 within a regular block 206. The page of data may be received in the buffer 204 of the non-volatile storage device 104 and the non-volatile storage device 104 may write the data to the page 208 of the regular block 206. The regular block 206 may have a designated backup block 210 and a copy of the data may be written to a page 212 within the backup block 210.

The buffer 204 may comprise a cache buffer and a regular buffer. A cache program operation may acknowledge the storage controller 102 upon the completion of the data transfer from the cache buffer into the data buffer. In contrast, a regular program operation will not acknowledge the storage controller 102 until the completion of the data transfer into the storage array of the non-volatile storage device 104 (e.g., the regular block 206), which take a long time of tPROG in the order of several milliseconds. By using the backup block 210 to store a copy of the page of data 202, even if there is a program error while writing the data to regular block 206, the cache program operation to write the page of data to the page 208 of the regular block 206 may acknowledge the storage controller 102 upon the completion of the data transfer from the cache buffer into the data buffer without data loss.

In some embodiments, for every page of data that is written into the non-volatile storage device 104 by a cache program operation from the storage controller 102, the non-volatile storage device 104 may make a copy of the data and write the copy of the data into a backup block m (with m being one of 0, 1, . . . , M−1), in addition to writing the data into the regular block as specified in the address of the cache program operation. The copy of the data may also be referred to as a backup copy of the data.

In an example implementation, the number of backup blocks in a list of backup blocks may be set as 4 per plane. This is because at a given time while the data is being written into the storage array of the non-volatile storage device 104, there may be a maximum 2 additional transfers per plane, one from the storage controller 102 to the cache buffer of the non-volatile storage device 104 and another from the cache buffer of the non-volatile storage device 104 into the data buffer of the non-volatile storage device 104. By having 4 backup blocks per plane, it may be ensured that the data in a backup block will not be overwritten before a program error is asserted.

A mapping table may be maintained to link the backup blocks with the regular blocks. The mapping table may record which backup block each regular block is mapped into. In one embodiment, the mapping table may be managed by the storage controller 102 and updated dynamically. In another embodiment, the mapping table may also be managed by the non-volatile storage device 104 and made visible to the storage controller 102. It should be noted that if the non-volatile storage device 104 has a plurality of planes, in one embodiment, there may be a plurality of mapping tables for each plane such that each plane may have its own mapping table. In another embodiment, the non-volatile storage device 104 may have one mapping table for all regular blocks. Table One shows an exemplary mapping between regular blocks and backup blocks in one embodiment. It should be noted that the left column may comprise many distinct blocks while the right column may comprise M blocks repeated in a round robin manner.

| Mapping Table One Mapping Between Regular Blocks and Backup Blocks | |
| --- | --- |
| Block A | Block 0 |
| Block B | Block 1 |
| . . . | . . . |

Figure 3:
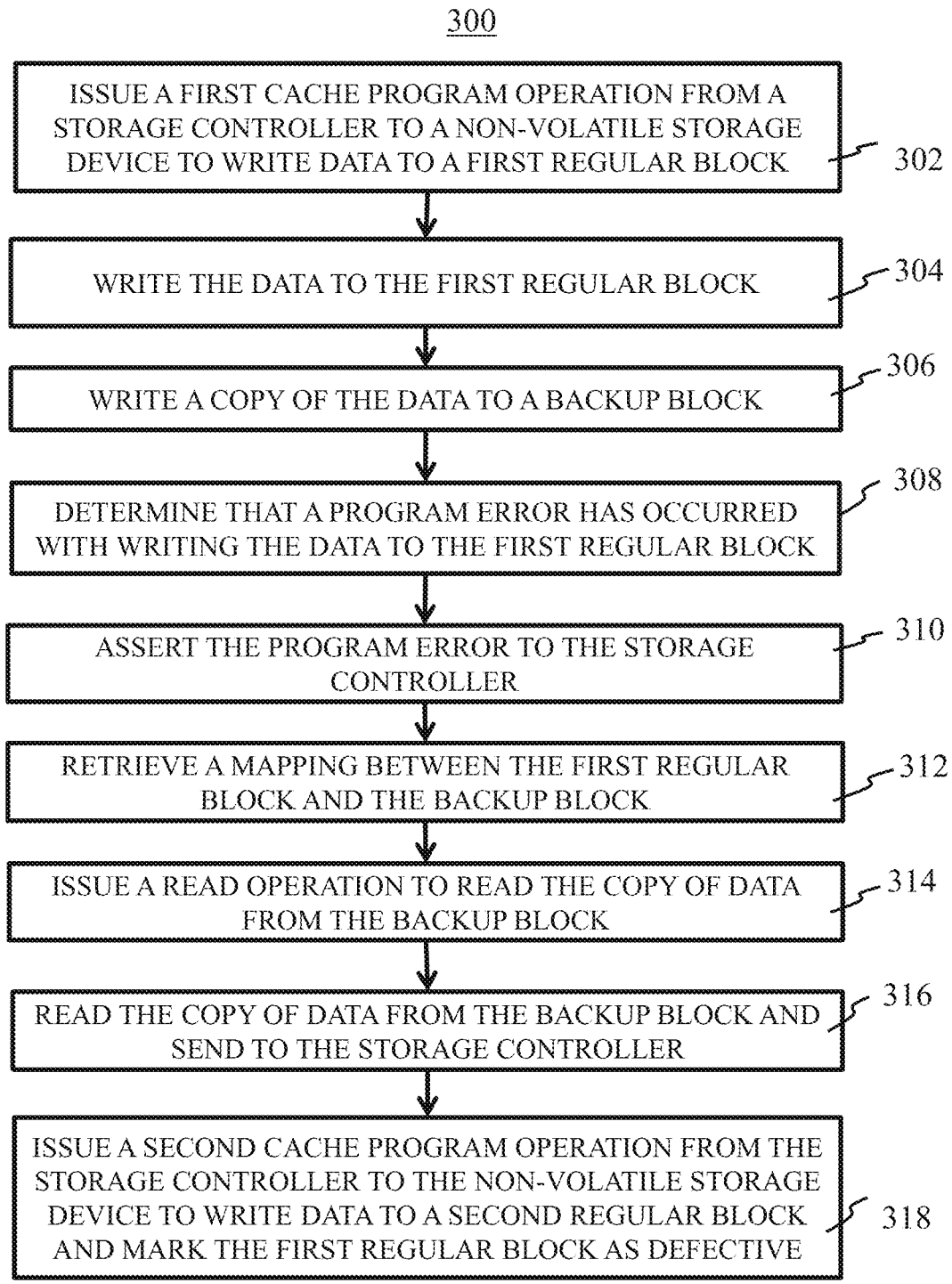
FIG. 3 is a flowchart of a process for performing a cache program operation in a non-volatile storage system in accordance with an embodiment of the present disclosure.

FIG. 3 is a flowchart of a process 300 for performing a cache program operation in a non-volatile storage system in accordance with an embodiment of the present disclosure. In block 302, a first cache program operation may be issued from a storage controller to a non-volatile storage device to write data to a first regular block. In one embodiment, for example, the storage controller 102 may issue a cache program operation to the non-volatile storage device 104 to write data to a regular block A in the non-volatile storage device 104. In block 304, the data may be written to the first regular block at the non-volatile storage device according to the cache program operation and in block 306, a copy of the data may be written to a backup block at the non-volatile storage device. In one embodiment, with mapping from the regular block A to a backup block 0 as shown in the example Mapping Table One, a copy of the data may be written to the backup block 0 mapped to the regular block A.

In block 308, it may be determined that a program error has occurred while writing the data to the first regular block and in block 310, the program error may be asserted to the storage controller. In one embodiment, if there is no program error reported with programming to the regular block A, the cache program operation may be considered as successfully completed. However, if there is any program error reported while writing the data to the regular block A, the non-volatile storage device 104 may assert the program error to the storage controller 102.

In block 312, the storage controller may retrieve a mapping between the first regular block and the backup block from a mapping table. In one embodiment, upon receiving the program error, the storage controller 102 may obtain the mapping between the regular block A and the backup block 0 from the Mapping Table One.

In block 314, a read operation may be issued from the storage controller to the non-volatile storage device to read the copy of the data from the backup block. In one embodiment, with the mapping information, the storage controller 102 may determine that a copy of the data is stored in the backup block 0 and issue a read operation to the non-volatile storage device 104 to read the copy of the data from the backup block 0. In block 316, the copy of the data may be read from the backup block and sent to the storage controller. For example, the non-volatile storage device 104 may read the copy of the data from the backup block 0 and send the copy of the data to the storage controller 104. In block 318, the storage controller may issue a second cache program operation to the non-volatile storage device to write the data to a second regular block and mark the first regular block as defective. In one embodiment, with the copy of the data obtained from the backup block 0, the storage controller 102 may issue another cache program operation to write the data to another regular block (e.g., the regular block B, which may be mapped to the backup block 1 according to the Mapping Table One). Meanwhile, the storage controller 102 may label block A as a bad block and remove it from storage usage.

At least portion of the process 300 may be implemented using software (e.g., executable by a computer processor (CPU, GPU, or both)), hardware (e.g., a field-programmable gate array (FPGA) or an application-specific IC (ASIC), firmware, or any suitable combination of the three. In one embodiment, for example, portions of the process 300 to be performed by the storage controller 102 may be programmed in computer processor executable instructions, stored in a non-transitory machine-readable medium (e.g., the memory 108, the non-volatile storage device 104, hard drive, CD, DVD, etc.) and performed by the processor 102 (e.g., a microprocessor or a microcontroller) executing the executable instructions.

In an exemplary embodiment, there is provided a method that may comprise: issuing a first cache program operation from a storage controller to a non-volatile storage device to write data to a first regular block, writing the data to the first regular block at the non-volatile storage device according to the cache program operation, writing a copy of the data to a backup block at the non-volatile storage device, determining that a program error has occurred while writing the data to the first regular block, asserting the program error to the storage controller, retrieving by the storage controller a mapping between the first regular block and the backup block from a mapping table, issuing a read operation from the storage controller to the non-volatile storage device to read the copy of the data from the backup block, reading the copy of the data from the backup block and sending the copy of the data to the storage controller, and issuing a second cache program operation from the storage controller to the non-volatile storage device to write the data to a second regular block and marking the first regular block as defective.

In one embodiment, the backup block may comprise storage cells that are single-bit cells, and the first regular block and the second regular block comprise storage cells that are multi-bit cells.

In one embodiment, the method may further comprise obtaining an error count for the backup block, determining that the backup block has reached its lifetime when the error count reaches a threshold value, and replacing the backup block with a new backup block.

In one embodiment, replacing the backup block with the new backup block may comprise replacing the backup block with the new backup block in the mapping table.

In one embodiment, the mapping table may contain four (4) backup blocks repeatedly mapped to regular blocks in a plane in a round robin manner.

In one embodiment, the mapping table may be managed by the storage controller.

In one embodiment, the mapping table may be managed by the non-volatile storage device and provided to the storage controller for the storage controller to obtain the mapping between the first regular block and the backup block.

In one embodiment, the backup block may be a spare block provided by overprovision.

In another exemplary embodiment, there is provided a non-volatile storage system. The non-volatile storage system may comprise a non-volatile storage device and a storage controller coupled to the non-volatile storage device. The storage controller may be configured to: issue a first cache program operation to the non-volatile storage device to write data to a first regular block, receive a program error from the non-volatile storage device, retrieve a mapping between the first regular block and a backup block from a mapping table, issue a read operation to the non-volatile storage device to read a copy of the data from the backup block, and issue a second cache program operation to the non-volatile storage device to write the data to a second regular block and mark the first regular block as defective. The non-volatile storage device may be configured to: write the data to the first regular block according to the cache program operation, write the copy of the data in the backup block, determine that the program error has occurred while writing the data to the first regular block, assert the program error to the storage controller, read the copy of the data from the backup block according to the read operation and send the copy of the data to the storage controller.

In one embodiment, the backup block may comprise storage cells that are single-bit cells, and the first regular block and the second regular block comprise storage cells that are multi-bit cells.

In one embodiment, the storage controller may be further configured to obtain an error count for the backup block, determine that the backup block has reached its lifetime when the error count reaches a threshold value, and replace the backup block with a new backup block.

In one embodiment, replacing the backup block with the new backup block may comprise replacing the backup block with the new backup block in the mapping table.

In one embodiment, the mapping table may contain four (4) backup blocks repeatedly mapped to regular blocks in a plane in a round robin manner.

In one embodiment, the mapping table may be managed by the storage controller.

In one embodiment, the mapping table may be managed by the non-volatile storage device and provided to the storage controller for the storage controller to obtain the mapping between the first regular block and the backup block.

In one embodiment, the backup block may be a spare block provided by overprovision.

In yet another exemplary embodiment, there is provided a non-transitory machine-readable medium. The non-transitory machine-readable medium may have computer instructions that when executed by a hardware processor of a storage controller, cause the hardware processor to: issue a first cache program operation a non-volatile storage device to write data to a first regular block, receive a program error from the non-volatile storage device, retrieve a mapping between the first regular block and a backup block from a mapping table, issue a read operation to the non-volatile storage device to read a copy of the data from the backup block and issue a second cache program operation to the non-volatile storage device to write the data to a second regular block and mark the first regular block as defective.

In one embodiment, the backup block may comprise storage cells that are single-bit cells and is one of spare blocks provided by overprovision, and the first regular block and the second regular block comprise storage cells that are multi-bit cells.

In one embodiment, the computer instructions, when executed by the hardware processor of the storage controller, may further cause the hardware processor to: obtain an error count for the backup block, determine that the backup block has reached its lifetime when the error count reaches a threshold value, and replace the backup block with a new backup block.

In one embodiment, wherein the mapping table may be managed by the storage controller, or managed by the non-volatile storage device and provided to the storage controller for the storage controller to obtain the mapping between the first regular block and the backup block.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   issuing a first cache program operation from a storage controller to a non-volatile storage device to write data to a first regular block of the non-volatile storage device;
   receiving the data into a cache buffer of the non-volatile storage device from the storage controller;
   transferring the data from the cache buffer into a data buffer of the non-volatile storage device;
   upon completion of transferring the data from the cache buffer into the data buffer, acknowledging the storage controller;
   writing the data from the data buffer to the first regular block, wherein storage cells in the first regular block are multi-bit cells;
   writing the data from the data buffer to a backup block of the non-volatile storage device, as a copy of the data, wherein storage cells in the backup block are single-bit cells;
   determining that a program error has occurred in writing the data to the first regular block;
   asserting the program error to the storage controller;
   retrieving, by the storage controller, a mapping between the first regular block and the backup block from a mapping table;
   issuing a read operation from the storage controller to the non-volatile storage device to read the copy of the data from the backup block;
   reading the copy of the data from the backup block and sending the copy of the data to the storage controller; and
   issuing a second cache program operation from the storage controller to the non-volatile storage device to write the data to a second regular block of the non-volatile storage device, wherein storage cells in the second regular block are multi-bit cells, and
   marking the first regular block as defective;
   wherein the mapping table contains four (4) backup blocks repeatedly mapped to regular blocks in a plane in a round robin manner.

2. The method of claim 1, further comprising obtaining an error count for the backup block and determining that the backup block has reached its lifetime when the error count reaches a threshold value, and replacing the backup block with a new backup block.

3. The method of claim 2, wherein replacing the backup block with the new backup block comprises replacing the backup block with the new backup block in the mapping table.

4. The method of claim 1, wherein the mapping table is managed by the storage controller.

5. The method of claim 1, wherein the mapping table is managed by the non-volatile storage device and provided to the storage controller for the storage controller to obtain the mapping between the first regular block and the backup block.

6. The method of claim 1, wherein the backup block is a spare block provided by overprovision.

7. A non-volatile storage system, comprising:
   a non-volatile storage device; and
   a storage controller coupled to the non-volatile storage device;
   wherein the storage controller is configured to:
      issue a first cache program operation to the non-volatile storage device to write data to a first regular block of the non-volatile storage device, wherein storage cells in the first regular block are multi-bit cells;
      receive a program error from the non-volatile storage device;
      retrieve, from a mapping table, a mapping between the first regular block and a backup block of the non-volatile storage device, wherein storage cells in the backup block are single-bit cells;
      issue a read operation to the non-volatile storage device to read a copy of the data from the backup block;
      issue a second cache program operation to the non-volatile storage device to write the data to a second regular block of the non-volatile storage device, wherein storage cells in the second regular block are multi-bit cells; and
      mark the first regular block as defective; and
   wherein the non-volatile storage device is configured to:
      receive the data into a cache buffer of the non-volatile storage device from the storage controller;
      transfer the data from the cache buffer to a data buffer of the non-volatile storage device;
      acknowledge the storage controller upon completion of transferring the data from the cache buffer into the data buffer;
      write the data from the data buffer to the first regular block;
      write the data from the data buffer in the backup block, as the copy of the data;
      determine that the program error has occurred in writing the data to the first regular block;
      assert the program error to the storage controller; and
      read the copy of the data from the backup block and send the copy of the data to the storage controller;
   wherein the mapping table contains four (4) backup blocks repeatedly mapped to regular blocks in a plane in a round robin manner.

8. The non-volatile storage system of claim 7, wherein the storage controller is further configured to obtain an error count for the backup block, determine that the backup block has reached its lifetime when the error count reaches a threshold value, and replace the backup block with a new backup block.

9. The non-volatile storage system of claim 8, wherein replacing the backup block with the new backup block comprises replacing the backup block with the new backup block in the mapping table.

10. The non-volatile storage system of claim 7, wherein the mapping table is managed by the storage controller.

11. The non-volatile storage system of claim 7, wherein the mapping table is managed by the non-volatile storage device and provided to the storage controller for the storage controller to obtain the mapping between the first regular block and the backup block.

12. The non-volatile storage system of claim 7, wherein the backup block is a spare block provided by overprovision.

13. A non-transitory machine-readable medium having computer instructions, wherein the computer instructions, when executed by a hardware processor of a storage controller, cause the hardware processor to:

issue a first cache program operation to a non-volatile storage device to write data to a first regular block of the non-volatile storage device, wherein storage cells in the first regular block are multi-bit cells, wherein the non-volatile storage device is configured to receive the data into a cache buffer of the non-volatile storage device, to transfer the data from the cache buffer to a data buffer of the non-volatile storage device, to acknowledge the storage controller upon completion of transferring the data from the cache buffer into the data buffer, to write the data from the data buffer to the first regular block, and to write the data from the data buffer to a backup block of the non-volatile storage device, as a copy of the data, wherein storage cells in the backup block are single-bit cells;

receive a program error from the non-volatile storage device;

retrieve a mapping between the first regular block and the backup block from a mapping table;

issue a read operation to the non-volatile storage device to read the copy of the data from the backup block;

issue a second cache program operation to the non-volatile storage device to write the data to a second regular block of the non-volatile storage device, wherein storage cells in the second regular block are multi-bit cells; and mark the first regular block as defective;

wherein the mapping table contains four (4) backup blocks repeatedly mapped to regular blocks in a plane in a round robin manner.

14. The non-transitory machine-readable medium of claim 13, wherein the backup block is one of spare blocks provided by overprovision.

15. The non-transitory machine-readable medium of claim 13, wherein the computer instructions, when executed by the hardware processor of the storage controller, further cause the hardware processor to: obtain an error count for the backup block, determine that the backup block has reached its lifetime when the error count reaches a threshold value, and replace the backup block with a new backup block.

16. The non-transitory machine-readable medium of claim 13, wherein the mapping table is managed by the storage controller, or managed by the non-volatile storage device and provided to the storage controller for the storage controller to obtain the mapping between the first regular block and the backup block.

* * * * *